March 10, 1964 O. E. DE LANGE 3,124,702

MULTIVIBRATOR EMPLOYING TWO-TERMINAL NEGATIVE RESISTANCE DEVICES

Filed Dec. 31, 1959 2 Sheets-Sheet 1

INVENTOR
O. E. DE LANGE
BY E. J. Oluider
ATTORNEY

March 10, 1964

Filed Dec. 31, 1959

O. E. DE LANGE

MULTIVIBRATOR EMPLOYING TWO-TERMINAL NEGATIVE RESISTANCE DEVICES 3,124,702

2 Sheets-Sheet 2

INVENTOR
O. E. DE LANGE
BY E J Oluider
ATTORNEY

United States Patent Office 3,124,702
Patented Mar. 10, 1964

3,124,702

MULTIVIBRATOR EMPLOYING TWO-TERMINAL NEGATIVE RESISTANCE DEVICES

Owen E. De Lange, Rumson, N.J., assignor to Bell Telephone Laboratories, Incorporated, New York, N.Y., a corporation of New York Filed Dec. 31, 1959, Ser. No. 863,341
14 Claims. (Cl. 307—88.5)

This invention relates to multivibrator circuits and, more particularly, to improvements in the type of multivibrator circuit which may be operated selectively in either the monostable or bistable mode.

The application of multivibrator circuits to the solution of electronic-switching, signal-translating, logic, and control problems is well known in the art. Characteristically, a basic multivibrator circuit employs a pair of circuit devices which are each capable of assuming either one of two operating states. For example, two electron tubes may be employed in an arrangement in which one tube is in a conducting state and the other in a nonconducting state. Conventionally, this condition may be reversed with the application of a suitable input signal. Similarly, transistors and double-based diodes have been employed as the key bistable elements in multivibrator circuits. Although the circuit devices noted are characterized by the essential property of bistability, other inherent properties impose undesirable limitations on the utility of the multivibrator circuits in which they are employed. For example, even though the switching speeds of transistors are orders of magnitude greater than that of electron tubes, these speeds are often inadequate to meet the requirements of the present computer technology. Additionally, the characteristics of the bistable devices employed heretofore are such that the interconnecting circuitry required is undesirably complex in that an undue number of cooperating circuit elements are required. The cost of such circuits and the likelihood of circuit failures are correspondingly high.

A general object of the invention, therefore, is to provide improvements in multivibrator circuits.

A more specific object of the invention is to provide multivibrator circuitry of increased operating speed.

A further object of the invention is to provide multivibrator circuits employing reduced numbers of circuit elements in relation to the numbers required in the arrangements of the prior art.

These and other objects are attained in accordance with the principles of the invention by the employment, as the key elements in a multivibrator circuit, of a pair of two-terminal, asymmetrically conducting impedance devices, each device having a current-voltage characteristic which includes a region of negative resistance bounded by a first and a second region of positive resistance.

The principles of the invention arise in part from the realization that the operating characteristics of a particular type of negative-resistance, voltage-controlled diode may be uniquely turned to account in a multivibrator circuit with a marked increase in speed of operation and a substantial reduction in the number of supporting circuit elements required in comparison to multivibrators known heretofore.

In one specific illustrative embodiment of the invention a series pair of negative resistance diodes is shunted by a single capacitor having a magnitude which is uniquely related to the switching speed of the diodes. A second branch of the circuit, which is also connected across the diode pair, biases the diodes so that in the quiescent condition of the circuit one diode is in its low voltage state, which corresponds to a point lying within its first region of positive resistance, and the second diode is in its high voltage state, which corresponds to a point lying within its second region of positive resistance. A common point on the conducting path between the two diodes is held at ground or some other suitable reference potential. Input signals are applied to the free terminal of one of the diodes, which may be termed the input diode, through an isolating element, and output signals are taken from the free terminal of the second or output diode and applied to a utilization device through a suitable isolating element. In effect, input signals are applied across the input diode and output signals are derived from across the output diode.

Operation of the circuit is effected by the application of an input signal of suitable magnitude and polarity that switches the input diode from one operating condition or state to the other. The accompanying voltage change is applied to the output diode by the coupling capacitor which causes an opposite shift in the condition of the output diode. The trace of the resulting output signal shows an abrupt and amplified change in voltage which remains at the new level until the application of a second input signal. The action described is made repetitive with the successive application of input pulses, and hence the function performed is that of a bistable multivibrator. It should be noted at this point that circuits performing the function described are also commonly termed trigger circuits or flip-flops.

The principles of the invention are not restricted to the bistable mode of operation since a simple shift in the magnitude of the bias current results in a conversion to monostable action. The bias shift required to effect this change in mode may be specifically defined in terms of the operating characteristics of the diodes.

Another aspect of the invention involves the employment of a third negative resistance diode in the basic circuit described above. The third diode is used in combination with a second capacitor to form a unique amplifying and differentiating circuit in the output branch of the multivibrator. A second bias means is included to fix the operating point of the third diode in a position that will shift across the negative resistance region in response to the multivibrator output, thereby providing amplification; and the magnitude of the capacitor is selected to have a preassigned relation to the magnitude of the resistance of the third diode, thereby providing differentiation. This dual function of amplification and differentiation is particularly desirable in multivibrator applications which require output pulses of somewhat greater magnitude that can be supplied by the basic circuit and which require output pulses which closely approach ideal squareness or rectangularity, irrespective of the form of the input signals.

Accordingly, one feature of the invention is the employment of a pair of voltage-controlled, negative-resistance diodes as the key elements in a multivibrator circuit.

Another feature of the invention is the employment of a single voltage-controlled, negative-resistance diode and a capacitor as a combination amplifier and differentiator in the output branch of a multivibrator circuit which employs a pair of such diodes as the key bistable elements.

A further feature of the invention is the employment of a shunt capacitor to interconnect a series pair of negative resistance diodes in a multivibrator circuit.

The principles of the invention, together with additional objects and features thereof, will be fully apprehended by considering the following detailed description and accompanying drawing in which.

Prior to a detailed consideration of the specific embodiments of the invention, it will be helpful to examine briefly the operating principles and characteristics of a voltage-controlled, negative-resistance diode which is illustrative of the type employed to implement the principles of the invention. One typical device of this type, commonly termed an Esaki or tunnel diode, is formed from a wafer of n-type germanium. An alloying process is employed to desposit a relatively small bead or mesa of metal on one face of the wafer, thereby forming an extremely narrow p-n junction between the mesa and the body of the wafer.

Figure 1:
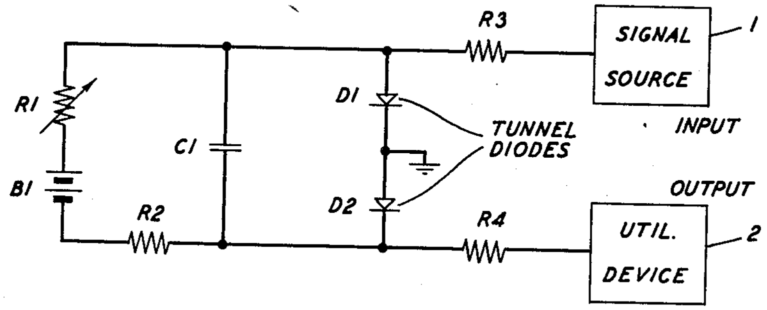
FIG. 1 is a schematic circuit diagram of a multivibrator in accordance with the principles of the invention.
Figure 2:
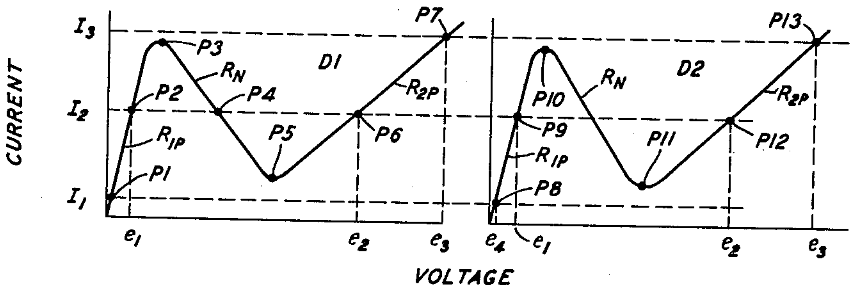
FIG. 2 is a plot of the current-voltage characteristics of each of the two diodes shown in FIG. 1.

FIG. 2 shows a pair of voltage-current plots illustrating the operating characteristics of each of the two tunnel diodes employed in the circuit of FIG. 1. For the purpose of the present discussion, reference will be made only to the curve labeled D1. As shown, a primary identifying feature of the current-voltage characteristic of a tunnel diode is a high current peak P3 and a low current peak P5 which occur, respectively, at the intersection of a first positive resistance region $R_{1P}$ with the negative resistance region $R_N$ and at the intersection of a second positive resistance region $R_{2P}$ with the negative resistance region $R_N$. It is apparent that each particular voltage magnitude has a single corresponding current magnitude while certain current magnitudes correspond to any one of three voltages. For example, a current such as $I_2$ corresponds to a stable operating point P2 in the first region of positive resistance $R_{1P}$, to an unstable operating point P4 in the negative resistance region $R_N$ and to a second stable operating point P6 in the second region of positive resistance $R_{2P}$.

The flow of current in a tunnel diode in the forward direction and the accompanying rapidity with which the device may be switched from one region of positive resistance to the other are attributable in part to the high field intensity associated with very narrow p-n junctions and to the high concentration of impurity atoms. These conditions produce an apparent penetration or "tunneling" action of relatively low energy carriers through the relatively high energy barrier which exists at the p-n junction. In terms of the theory of quantum mechanics, it is known that there is always a calculable probability of finding such behavior within a restricted voltage interval. The narrower the diode junction, and the greater its impurity concentration, the higher the probability of barrier penetration. The substantially slower action of conventional p-n junction devices is attributable to the fact that little or no "tunneling" takes place, the movement of carriers across the junction being explained in terms of drift and diffusion phenomena.

Returning again to the examination of the operating characteristics of a specific illustrative tunnel diode, as represented by the curve D1 of FIG. 2, let us assume that the diode is in the quiescent condition at operating point P2. A transistion to the operating point P7, or a shift from the low voltage to the high voltage state, can be effected in a period as brief as $10^{-11}$ seconds after the application of a driving signal of suitable magnitude and polarity. Such a signal must supply sufficient current to increase the total current to a level which exceeds the current peak P3. It is evident that the current $I_3$ meets this requirement. The almost instantaneous shift of the operating point to point P7 is accompanied by a corresponding increase in voltage from $e_1$ to $e_3$ and it is this abrupt voltage change which characterizes the amplified output signal. So long as the input signal persists, the operating point is held at P7, but upon the termination of the signal, assuming a fixed bias current such as $I_2$, the device assumes the stable operating point P6 and the output voltage is reduced to $e_2$. If a lower value of bias current such as $I_1$ is employed, assuming that the current supplied by the input signal is sufficient to raise the total current to $I_3$ for the duration of the input pulse, the termination of the pulse effects an abrupt shift of the operating point back to the positive resistance region $R_{1P}$ coming to rest at point P1. It is evident, therefore, that a single tunnel diode is selectively bistable or monostable and that the mode preferred may be attained by the application of a suitable biasing current. A more detailed explanation of the theory of operation of tunnel diodes is presented by Leo Esaki in the Physical Review, 1958, vol. 109, page 603.

The significant tunnel diode operating characteristics described above are uniquely turned to account in the multivibrator circuit shown in FIG. 1. The circuit comprises a series pair of tunnel diodes D1 and D2 each having characteristics as shown by the corresponding current-voltage plots D1 and D2 of FIG. 2. A single capacitor C1 is shunted across the diode pair D1, D2. Means for biasing the diodes include the fixed voltage source B1, the variable resistor R1, and the fixed resistor R2. Input pulses from the signal source 1 are applied across the input diode D1 by way of an isolating resistor R3. Output signals appearing across the output diode D2 are applied to a utilization device by way of an isolating resistor R4.

To prepare the circuit for operation, the bias conditions must be adjusted by means of the variable resistor R1 so that the diodes D1 and D2 are in opposite states. For example, diode D1 may be in the low voltage condition and diode D2 may be in the high voltage condition. A desirable operating point can be attained for each diode by setting the bias current at $I_2$, as shown in FIG. 2. Knowing the diode characteristics, the voltage across the diode pair can be set to equal $e_1+e_2$ when the current is $I_2$. This condition is established by choosing the biasing voltage E of the biasing source B1 and the magnitudes of the resistors R1 and R2 such that $$E - I_2(R1+R2) = e_1+e_2 \quad (1)$$

As long as the voltage across the pair is maintained at the value $e_1+e_2$, one diode must be in the high voltage condition and the other in the low voltage condition. One purpose served by the capacitor C1 is that of keeping the voltage across the diode pair substantially equal to $e_1+e_2$ for a period of time which is at least as great as that required for one of the diodes to switch states. Accordingly, the establishment of the initial operating point of each of the diodes at P2 and P12, respectively, and the interconnection of the free terminals of the diodes by the capacitor C1 ensures that the switching of diode D1 from the low voltage to the high voltage condition must be followed by the switching of diode D2 from the high voltage to the low voltage condition.

As explained above, a total current equal to or exceeding the level represented by the current peak P3 is required to drive the diode D1 into the high voltage condition. Thus, upon the incidence of an input pulse having a current magnitude equal to $I_3 - I_2$, the operating point of diode D1 is shifted abruptly from point P2 to P7. The time required for the transition from P2 to P3 is dependent on the rise time of the input pulse while the time for the transition from P3 to P7 reflects the characteristic switching speed of the diode. The shift in operating points is accompanied by a corresponding change in voltage, namely, the voltage increase from $e_1$ to $e_3$, which is also illustrated by the waveform D1 of FIG. 3A.

In accordance with the principles of the invention, the magnitude of the capacitor C1 has a preassigned relation to the switching time of the diodes. Specifically, the magnitude is selected to be sufficiently high so that the voltage across the capacitor C1 cannot change appreciably for a period of time equal to the switching time of the diode D1. When the diode D1 switches state, the coupling action of the capacitor C1 applies the resulting voltage change to the diode D2 but, from the viewpoint of the polarity of the diode D2, the direction of the voltage change is reversed. A corresponding change in current flow through the diode D2 is effected which is at least equal in magnitude but opposite in direction to the current change that switched the operating point of the diode D1. The current $I_1$, as shown in FIG. 2, then flowing through the diode D2 is sufficiently below the inverted current peak P11 to switch the operating point of the diode D2 from point P12 to point P8.

The operating points of the diodes D1 and D2 remain at points P7 and P8, respectively, for the duration of the input pulse. Upon the termination of the pulse, however, the only source of current is once again the biasing branch of the circuit and current flow returns to the level $I_2$. A corresponding shift in the operating points of the diodes D1 and D2 also takes place, namely, from point P7 to P6 and from P8 to P9. The change in voltage corresponding to the shift of the operating point of the diode D2 across its region of negative resistance $R_N$ constitutes the output signal which is applied to a suitable utilization device 2 by way of the isolating resistor R4.

Figure 3A:
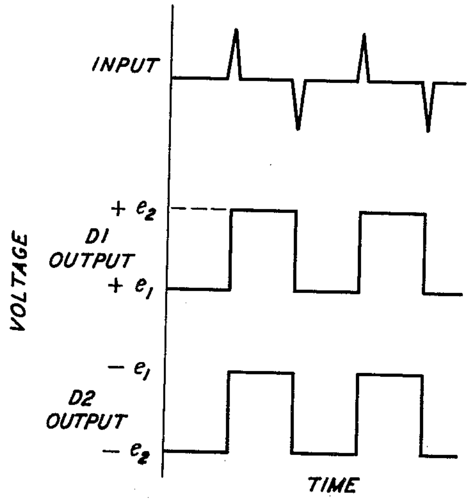
FIG. 3A is a plot of waveforms illustrating the action of the circuit of FIG. 1 as a bistable multivibrator.

FIG. 3A illustrates the interrelation of the input signal, the voltage change across the diode D1 and the output signal from the diode D2. In the interests of clarity, the minor voltage excursions which reflect the build-up and collapse of the input signal have been omitted since the peaking effect on the output signal has been found to be relatively insignificant.

The action described thus far constitutes a half cycle of multivibrator action since each of the diodes D1 and D2 is in an operating state opposite from that which existed at the inception of the input pulse. To complete a full cycle of operation, returning each of the diodes to its initial condition, requires a second input pulse which must be opposite in polarity to the initial pulse. The switching action which is initiated by the second pulse is exactly the reverse of the action already described and hence requires no further discussion. Two full cycles of operation are reflected by the waveforms of FIG. 3A.

Figure 3B:
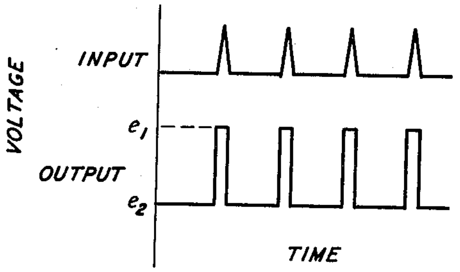
FIG. 3B is a plot of waveforms illustrating the action of the circuit of FIG. 1 as a monostable multivibrator.

The operation of the circuit as a monostable multivibrator, in contrast to the bistable action traced by the foregoing description, is effected simply by reducing the bias current from $I_2$ to $I_1$. When employing the bias current $I_1$, it is evident that the magnitude of the input pulse must be correspondingly greater so that the sum of the bias current and the pulse current attains a level such as $I_3$. Insofar as function is concern, monostable action is characterized by the return of each diode to its initial operating point at the termination of the input pulse. Accordingly, successive output pulses may be generated without reversing the polarity of the input pulses. Illustrative input and output pulses for the monostable mode are shown in FIG. 3B.

Figure 4:
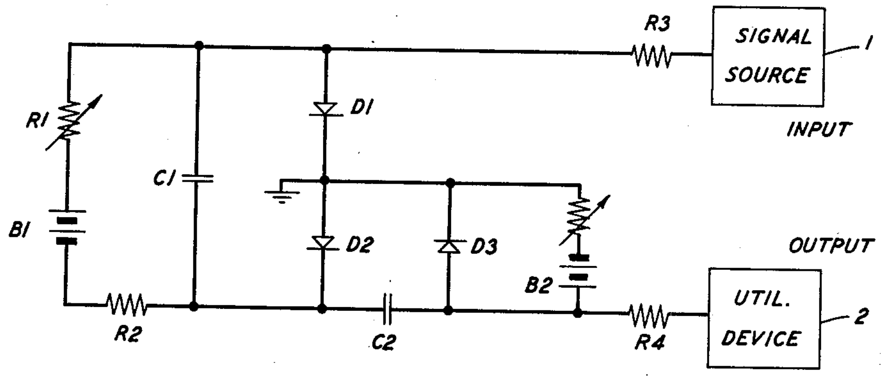
FIG. 4 is a schematic circuit diagram of a multivibrator in accordance with the invention which includes a differentiating circuit in the output branch.

Proceeding next to FIG. 4, the circuit shown is basically similar to the circuit of FIG. 1 and corresponding circuit elements are designated with like identifying characters. While the mutivibrator action of the circuit of FIG. 4 is identical to that of the circuit of FIG. 1, FIG. 4 illustrates an additional feature of the invention by the employment of a unique combination differentiating and amplifying circuit which acts on the output signal of the multivibrator. The differentiating circuit comprises the capacitor C2 and a third tunnel diode D3 together with biasing elements which include the fixed voltage source B2 and the variable resistor R5. The function of the circuit may best be described in terms of the waveforms shown in FIG. 5.

Figure 5:
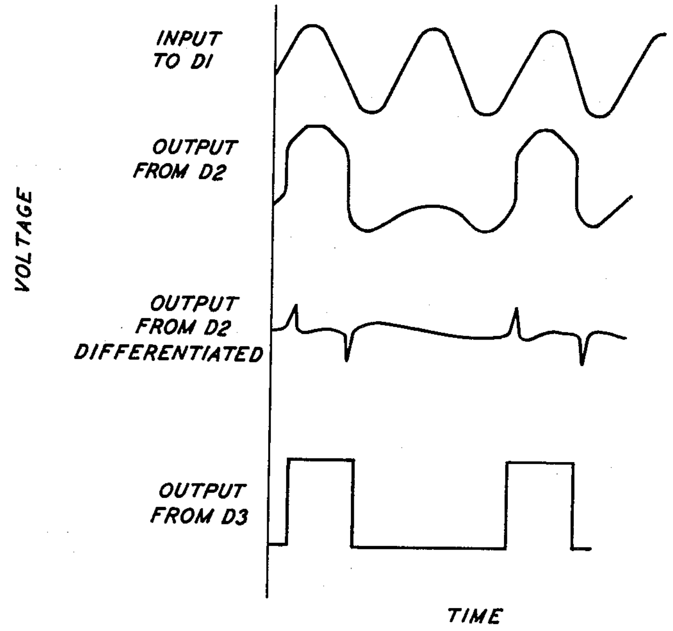
FIG. 5 is a plot of waveforms illustrating the operation of the circuit shown in FIG. 4.

In certain multivibrator applications, it is desirable to produce output pulses which approach ideal squareness or rectangularity while employing input signals which are substantially sinusoidal. An input waveform of this type is shown in FIG. 5. When such an input signal is applied to the diode D1, the coupling action of the capacitor C1 applies at least a part of the signal to the diode D2. As a result, the D2 output, as shown, takes the form of pulses which are only partially rectangular since a part of the input signal is superimposed thereon. In accordance with the principles of the invention, the capacitance of C2 and the positive resistance of the diode D3 perform a differentiating action on the output from the diode D2 which results in spiked pulses of alternating polarity. If the diode D3 included only positive resistance, these spike pulses would constitute the final circuit output. However, by employing a negative resistance or tunnel diode, and by fixing the bias at a point such as P2, as shown in FIG. 2, the final circuit output is made to reflect the abrupt voltage changes across the diode which correspond to successive shifts between its high and low voltage states. The virtually simultaneous differentiation and amplification actions thus produce the clean output waveform shown in FIG. 5.

A characteristic property of certain multivibrator circuits known in the prior art is that under certain preassigned conditions of input frequency and power, the multivibrator oscillations adjust themselves in frequency so that the ratio of the injected frequency to the multivibrator frequency is exactly a ratio of integers. This phenomenon is well understood and can be explained in terms of the bias on the bistable elements in relation to other known circuit parameters.

It has been found that a circuit incorporating the principal features of the invention, such as the circuit of FIG. 1, also exhibits the phenomenon described above. Within a well defined range of frequency, specifically 500 kc. to 1.5 mc., the circuit shown in FIG. 1 has been observed to count down by a factor of 2 when the input power was held below a preassigned level. Upon the increase of the input power beyond that level, or upon the departure of the input frequency from the range indicated, the input and output frequencies returned to coincidence. While the theory of the action of the circuit in performing the count-down function described is not fully understood, it is believed to result from a type of temporary storage phenomenon which takes place within the p-n junction of each of the diodes which establishes the requirement of two input signals to produce a single output signal. It appears likely that the circuit will perform variants of the count-down function described if suitable combinations of the circuit parameters are established.

It is to be understood that the above-described arrangements are illustrative of the application of the principles of this invention. Numerous other arrangements may be designed by those skilled in the art without departing from the spirit and scope of the invention.

What is claimed is:

1. A multivibrator circuit comprising, in combination, a series pair of two-terminal, similarly-poled, voltage-controlled, bistable, negative-resistance, asymmetrically conducting impedance devices, means for biasing one of said devices in a low voltage condition and the other of said devices in a high voltage condition, means for applying an input signal of preassigned magnitude and polarity across only a single one of said devices, whereby a first voltage difference is developed across said one device as said one device is switched from one of its stable states to the other, reactance means for applying said voltage difference across said other device in a direction opposite to said difference across said one device, said reactance means comprising a two-terminal reactance device having one terminal connected directly to one terminal of one of said asymmetrically conducting impedance devices and the other terminal connected directly to the opposite terminal of the other one of said asymmetrically conducting impedance devices, whereby a second voltage difference is developed across said other device as said other device is switched, in a direction opposite to the switching of said one device, from one of its stable states to the other, utilization means, and means for applying said second voltage difference to said utilization means.

2. Apparatus in accordance with claim 1 including means maintaining the common junction point of said asymmetrically conducting impedance devices at a fixed reference potential.

3. A multivibrator circuit comprising, in combination, a series pair of two-terminal, similarly-poled, voltage-controlled, bistable, negative-resistance, asymmetrically conducting impedance devices, means for biasing one of said devices in a low voltage condition and the other of said devices in a high voltage condition, means for applying an input signal of preassigned magnitude and polarity to one of said devices, whereby a first voltage difference is developed across said one device as said one device is switched from one of its stable states to the other, reactance means comprising a capacitor for applying said voltage difference across said other device in a direction opposite to said difference across said one device, means connecting said reactance means in shunt relation with said series pair, whereby a second voltage difference is developed across said other device as said other device is switched, in a direction opposite to the switching of said one device, from one of its stable states to the other, utilization means, and means for applying said second voltage difference to said utilization means.

4. A multivibrator circuit comprising, in combination, a series pair of two-terminal, similarly-poled, voltage-controlled, bistable, negative-resistance, asymmetrically conducting impedance devices, means for biasing one of said devices in a low voltage condition and the other of said devices in a high voltage condition, means connecting said biasing means in shunt relation with said series pair, means for applying an input signal of preassigned magnitude and polarity to one of said devices, whereby a first voltage difference is developed across said one device as said one device is switched from one of its stable states to the other, reactance means comprising a capacitor for applying said voltage difference across said other device in a direction opposite to said difference across said one device, means connecting said reactance means in shunt relation with said series pair, whereby a second voltage difference is developed across said other device as said other device is switched, in a direction opposite to the switching of said one device, from one of its stable states to the other, utilization means, and means for applying said second voltage difference to said utilization means.

5. A bistable multivibrator circuit comprising, in combination, a pair of diodes similarly poled in series relation each having a current-voltage characteristic which includes a region of negative resistance bounded by a first region of positive resistance corresponding to a low voltage condition and a second region of positive resistance corresponding to a high voltage condition, means for biasing one of said diodes at a point in its first positive resistance region and the other of said diodes at a point in its second positive resistance region, means for applying an input signal to one of said diodes whereby the operating point of said one diode is shifted from one region of positive resistance to the other, whereupon a first voltage difference is developed across said one diode, means for applying said first voltage difference across the other of said diodes in a direction opposite to the direction of development across said one diode, first voltage-difference applying means comprising a two-terminal reactance device having one terminal connected directly to one terminal of one of said diodes and the other terminal connected directly to the opposite terminal of the other of said diodes, whereby the operating point of said other diode is shifted from one region of positive resistance to the other, whereupon a second voltage difference is developed across said second diode, a utilization device, and means for applying said second voltage difference across said utilization device.

6. A bistable multivibrator circuit comprising, in combination, a pair of diodes similarly poled in series relation each having a current-voltage characteristic which includes a region of negative resistance bounded by a first region of positive resistance corresponding to a low voltage condition and a second region of positive resistance corresponding to a high voltage condition, means for biasing one of said diodes at a point in its first positive resistance region and the other of said diodes at a point in its second positive resistance region, means for applying an input signal to one of said diodes whereby the operating point of said one diode is shifted from one region of positive resistance to the other, whereupon a first voltage difference is developed across said one diode, means for applying said first voltage difference across the other of said diodes in a direction opposite to the direction of development across said one diode, said first voltage difference applying means comprising a capacitor in shunt relation with said diodes, said capacitor having a preassigned magnitude sufficient to maintain the voltage across said diodes substantially constant for a period equal to the time required to shift the operating point of one of said diodes from one of said regions of positive resistance to the other.

7. Apparatus in accordance with claim 5 including means maintaining the common junction point of said diodes at a fixed reference potential.

8. A monostable multivibrator circuit comprising, in combination, a pair of diodes similarly poled in series relation, each having a current voltage characteristic which includes a region of negative resistance bounded by a first and a second region of positive resistance corresponding, respectively, to a stable low voltage state and a stable high voltage state, means for biasing each of said diodes in the same stable state, a capacitor in shunt relation with said diodes, means for successively applying input signals to one of said diodes, thereby shifting the operating point of each of said diodes successively from said same stable state to the other one of said stable states, the operating point of each of said diodes remaining in said other stable state for the duration of each of said input pulses, whereby amplified voltage changes are developed successively across the other of said diodes, a utilization device, and means for applying said amplified voltage changes to said utilization device.

9. A trigger circuit comprising, in combination, a pair of series-connected, voltage-controlled, similarly poled tunnel diodes each having a region of negative resistance bounded by a first and a second region of positive resistance corresponding, respectively, to a low voltage stable state and to a high voltage stable state, first biasing means for establishing the operating point of one of said diodes in one of said regions of positive resistance and for establishing the operating point of the other of said diodes in the other of said regions of positive resistance, said operating points lying on a common current axis intersecting the negative resistance region of each of said diodes, means for applying successive input signals to one of said diodes, whereby the operating point of said one diode is shifted successively, between said stable states, thereby developing successive voltage changes across said one diode, means for applying said voltage changes to said other diode, whereby the operating point of said other diode is shifted, successively, between said stable states, each shift being in a direction opposite to the corresponding shift in said one diode, thereby developing output signals across said other diode, a third tunnel diode having a region of negative resistance bounded by a first and a second region of positive resistance, second biasing means for establishing the operating point of said third diode in one of said positive resistance regions, means including a first capacitor connecting said third diode in shunt relation with said other diode, whereby each of said output signals is amplified and differentiated, utilization means, and means for applying said amplified and differentiated output signals to said utilization means.

10. Apparatus in accordance with claim 9 wherein said voltage change applying means includes reactance means.

11. Apparatus in accordance with claim 10 wherein said reactance means includes a second capacitor.

12. Apparatus in accordance with claim 11 including means connecting said second capacitor in shunt relation with said pair of diodes.

13. A trigger circuit comprising, in combination, a pair of series connected voltage-controlled diodes, each characterized by a region of negative resistance bounded by a first and a second region of positive resistance which correspond, respectively, to first and second stable operating states, means including a first steady voltage source and at least one impedance device connected in shunt relation with said pair of diodes for biasing each of said diodes in a different one of said operating states, a source of input signals alternating in polarity, means for applying said input signals to one of said diodes, whereby said diode is switched, alternately, from one of said stable operating states to the other, thereby developing successive amplified voltage changes across said one diode, a first capacitor in shunt relation with said pair of diodes, whereby each one of said voltage changes effects a corresponding shift in the operating point of said other diode from one of said stable operating points to the other, thereby developing successive output signals across said other diode, a third voltage-controlled diode characterized by a region of negative resistance bounded by a first and a second region of positive resistance which correspond, respectively, to first and second stable operating states, means including a second capacitor connecting said third diode in shunt relation with said other diode, said third diode and said other diode being oppositely poled, whereby each of said output signals produces a corresponding amplified and differentiated voltage change across said third diode.

14. Apparatus in accordance with claim 13 including means biasing said third diode at a point lying on a current axis which intersects the region of negative resistance of said third diode.

References Cited in the file of this patent

UNITED STATES PATENTS 2,614,140 Kreer ---------------- Oct. 14, 1952

FOREIGN PATENTS 159,041 Australia ------------- Sept. 27, 1954

OTHER REFERENCES

Electronics, Aug. 7, 1959, page 61, "Tunnel Diode: Big Impact?"